Feb. 16, 1937.   A. W. HELLSTRÖM   2,070,730
METHOD OF PRODUCING TEETH ON FILES OR THE LIKE
Filed Dec. 5, 1934
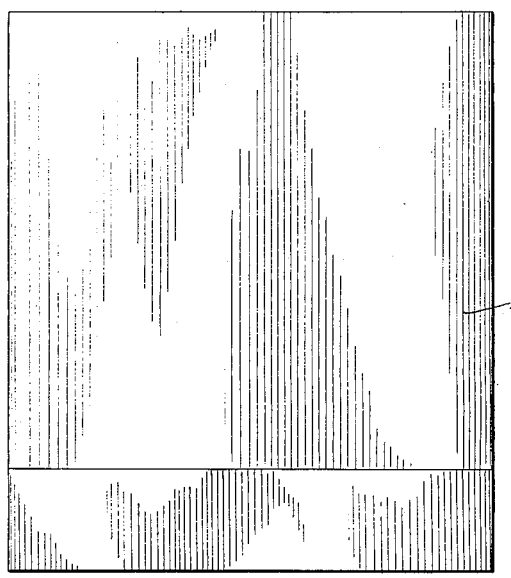
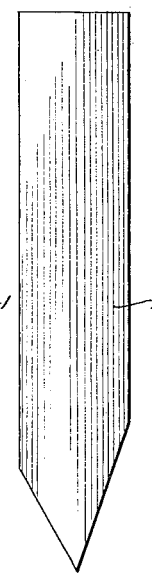
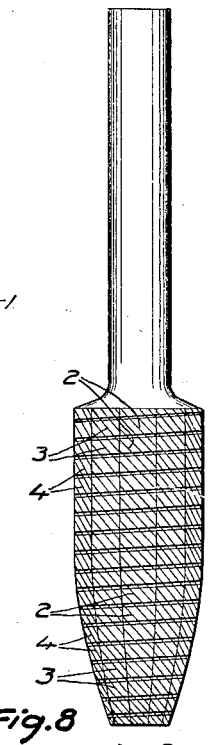
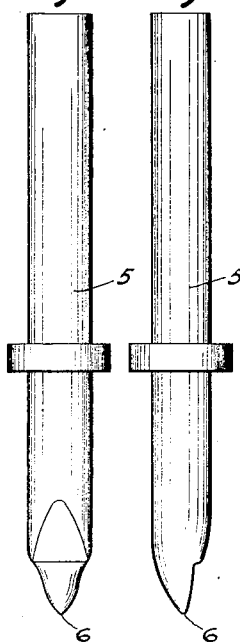
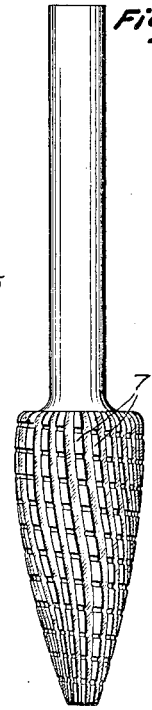
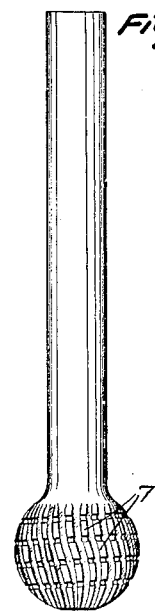

Patented Feb. 16, 1937

2,070,730

UNITED STATES PATENT OFFICE 2,070,730

METHOD OF PRODUCING TEETH ON FILES OR THE LIKE

Axel Waldemar Hellström, Eskilstuna, Sweden

Application December 5, 1934, Serial No. 756,158
In Sweden May 28, 1934

4 Claims. (Cl. 76—24)

Two methods have hitherto been used for producing teeth on files or the like having the teeth on plain or curved surfaces, particularly files of a circular cross section adapted for filing out, for example, round holes and deep flutes. According to one method the teeth have been produced by milling and according to the other method the teeth have been made by short strokes of a straight cut chisel which has operated in such a way that for each stroke the chisel or the blank has been displaced a distance corresponding to the distance between two teeth. These two methods have their drawbacks. When producing the teeth by milling, it is not possible, as a rule, to obtain the desired sharpness of the edge without special subsequent treatment. If, on the other hand, a straight cut chisel is used in the manner previously stated, the production of the teeth is rendered more difficult, and with curved surfaces it is still more difficult, and, if it is possible to produce the teeth at all, they become very inferior. Moreover, the production costs are comparatively high according to the said two methods.

The present invention relates to a process which enables a more simple and cheaper production of such teeth. According to the invention each tooth is cut by a plurality of working strokes of a cutting tool, the said strokes following immediately and successively after each other in the longitudinal direction of the tooth, the cutting tool having an edge variable from circular to quite acuminate shape.

The process according to the invention is particularly suitable for use in producing files of circular cross section in which each tooth extending along a straight or screw-shaped line only forms a small angle to the longitudinal axis of the file.

The invention is illustrated in the accompanying drawing in which:—

Figures 1 and 2 show, from different sides, a cut chisel of the kind hitherto used when cutting teeth on the files in question.

Figure 3 shows as an example a file, the teeth of which have been produced by means of the cut chisel according to Figures 1 and 2.

Figures 4 and 5 show, from two different sides, a cutting tool employed in carrying out the process according to this invention.

Figures 6, 7, 8 and 9 show as examples four different, round files the teeth of which have been produced by the cutting tool according to Figures 4 and 5.

According to Figure 3 the teeth of the file have, as already mentioned, been produced by the chisel according to Figures 1 and 2. According to this old method after each cut of the chisel either the latter or the file blank is displaced a distance corresponding to the distance between the teeth, so that the following cut of the chisel forms a new tooth, parallel to the tooth formed by the previous cut of the chisel. My method is quite different. After each cut the cutting tool is not moved a distance corresponding to the spacing between the center lines of adjacent teeth in order to produce a new tooth, but after each cut of the tool the next cut will fall partly within the previous cut and form a continuation of the same in order to elongate the tooth which is being produced. Thus, after each cut a displacement of the cutting tool or the file blank takes place only in the longitudinal direction of the tooth which is being produced, but not in the direction which causes a lateral spacing between the teeth, as when practicing the old method (Fig. 3). When a single tooth has been completed in this way throughout its whole length by a plurality of cuts following immediately after each other in the longitudinal direction of the tooth, the cutting tool or the file blank is only then displaced a distance corresponding to the distance between two teeth. At this time the cutting of a new tooth is begun, the said tooth being finished in its whole length by a plurality of cuts, as just described, before the next tooth is begun, etc. The difference as regards the result of the two methods is, among other things, that by my method a tooth is obtained which is completely continuous and unbroken throughout its whole length while the practice of the old method results in the teeth becoming broken and discontinuous.

In contradistinction to this old cutting method each tooth 7 is cut according to the invention on the files with circular cross section shown in Figures 6 to 9 by means of a plurality of working strokes of a cutting tool 5 (Figures 4 and 5), the said working strokes following immediately and successively after each other in the longitudinal direction of the tooth and along a sinuous or tortuous path, the said cutting tool having an elliptic or similar section passing to an edge 6 the shape of which may vary from circular to quite acuminate shape. After each stroke of the cutting tool the said tool or the blank is displaced a very small distance in the longitudinal direction of the tooth. Since at each stroke the cutting tool just described only meets the blank in one point it is possible according to this process to manufacture teeth on any plain or curved surfaces, whether the teeth run along screw-shaped or curved lines or extend along straight lines.

It is clear that the process may be used for cutting, not only teeth on files and the like having a circular cross section, but also teeth on the round or plain side of half-round or other files.

After the cutting, the produced teeth may, in a known way, be divided by means of a number of chip breaking grooves.

Having now described my invention, what I claim as new and desire to secure by Letters Patent is:

1. A method of producing files and the like having teeth arranged in a tortuous path longitudinally of the file comprising making a plurality of successive cuts with a pointed cutting tool along a tortuous path in a direction longitudinal of the file blank to form a tortuous continuous longitudinally-extending cutting edge and forming similar tortuous longitudinal cutting edges one at a time across the surface of said blank.

2. A method of producing files and the like having teeth arranged in a tortuous path longitudinally of the file comprising making a plurality of successive overlapping cuts with a pointed cutting tool along a tortuous path in a direction longitudinal of the file blank to form a tortuous continuous longitudinally-extending cutting edge and forming similar tortuous longitudinal cutting edges one at a time parallel to said first mentioned longitudinally-extending cutting edge across the surface of said blank.

3. A method of producing files and the like having teeth arranged in a tortuous path longitudinally of the file comprising making a plurality of successive cuts with a pointed cutting tool along a tortuous path in a direction longitudinal of the file blank to form a tortuous continuous longitudinally-extending cutting edge and forming similar tortuous longitudinal cutting edges one at a time across the surface of said blank, and then cutting transverse chip breaking grooves across said longitudinally extending cutting edges.

4. A method of producing rotating files and the like having curved surfaces and having teeth arranged in a tortuous path longitudinally of the axis of the file comprising making a plurality of successive cuts with a pointed cutting tool along a tortuous path extending in a direction longitudinal of the axis of the file blank to form a tortuous continuous longitudinally extending cutting edge and then forming similar tortuous parallel longitudinal cutting edges across the surface of said blank.

AXEL WALDEMAR HELLSTRÖM.